(12) United States Patent
Higuchi et al.

(10) Patent No.: US 7,193,630 B2
(45) Date of Patent: Mar. 20, 2007

(54) DATA STRUCTURE FOR TEXTURE DATA, COMPUTER PROGRAM PRODUCT, AND TEXTURE MAPPING METHOD

(75) Inventors: Yuichi Higuchi, Tokyo (JP); Naohiro Warama, Tokyo (JP)

(73) Assignee: Kabushiki Kaisha Sega, Tokyo (JP)

( * ) Notice: Subject to any disclaimer, the term of this patent is extended or adjusted under 35 U.S.C. 154(b) by 113 days.

(21) Appl. No.: 10/361,565

(22) Filed: Feb. 11, 2003

(65) Prior Publication Data

US 2003/0156117 A1    Aug. 21, 2003

(30) Foreign Application Priority Data

Feb. 19, 2002    (JP) .............................. 2002-042137

(51) Int. Cl.
*G09G 5/00*    (2006.01)
(52) U.S. Cl. ...................... 345/586; 345/426; 345/552; 345/584; 345/589
(58) Field of Classification Search ........ 345/582–589, 345/552, 643–644, 690
See application file for complete search history.

(56) References Cited

U.S. PATENT DOCUMENTS

| | | | | |
|---|---|---|---|---|
| 4,609,993 | A * | 9/1986 | Shimizu ...................... 345/421 |
| 4,835,712 | A * | 5/1989 | Drebin et al. ................ 345/423 |
| 4,930,010 | A * | 5/1990 | MacDonald ................ 358/530 |
| 5,469,274 | A * | 11/1995 | Iwasaki et al. ............. 358/450 |
| 5,489,274 | A * | 2/1996 | Chu et al. .............. 604/167.05 |
| 5,598,185 | A * | 1/1997 | Holmgren .................... 345/593 |
| 5,974,189 | A * | 10/1999 | Nicponski ................... 382/254 |
| 6,078,312 | A * | 6/2000 | Liebenow .................... 345/166 |
| 6,611,609 | B1* | 8/2003 | Zhu ............................ 382/103 |
| 6,747,660 | B1* | 6/2004 | Olano et al. ................ 345/582 |
| 6,751,339 | B1* | 6/2004 | Windle et al. .............. 382/108 |
| 6,850,242 | B1* | 2/2005 | Saito .......................... 345/586 |
| 2002/0060684 | A1* | 5/2002 | Alcorn et al. ............... 345/552 |
| 2003/0034981 | A1* | 2/2003 | Wada ......................... 345/581 |

OTHER PUBLICATIONS

Heckbert, P., "Survey of Texture Mapping", IEEE Computer Graphics and Applications, Nov. 1986, pp. 56-57.*
Heckbert, P. S., "Fundamentals of Texture Mapping and Image Warping," Master's Thesis, Dept. of Electrical Engineering and Comp. Science, UC Berkeley, CA, Jun. 17, 1989, p. 5.*

* cited by examiner

*Primary Examiner*—Kee M. Tung
*Assistant Examiner*—Antonio Caschera
(74) *Attorney, Agent, or Firm*—Finnegan, Henderson, Farabow, Garrett & Dunner

(57) ABSTRACT

The present invention has as an object to propose a texture mapping method which enables smooth shading, and is also appropriate for conserving memory resources. In order to achieve this object, in this invention, data regions with different color tones are set so as to form density gradients in the U coordinate direction and in the V coordinate direction of the texture data. If the brightness of the surface of the object to which texture mapping is performed is I, then among the coordinates to be read to access texture data, the U coordinate is calculated as U=a*I+b, and the V coordinate is determined from V=d. The value of the dynamic variable d can be set appropriately according to the application. Because the texture data is such that color tone density gradients are formed in two mutually orthogonal directions, smooth shading is possible, and a plurality of texture memory areas can be consolidated to conserve memory usage.

14 Claims, 5 Drawing Sheets

DATA STRUCTURE FOR TEXTURE DATA, COMPUTER PROGRAM PRODUCT, AND TEXTURE MAPPING METHOD

BACKGROUND OF THE INVENTION

1. Field of the Invention

This invention relates to a data structure for texture data, and in particular to a data structure appropriate for cell shading.

2. Description of the Related Art

In conventional computer graphics, a technique called cell shading is known as a method of texture mapping using multiple textures. Cell shading is also called toon shading; in this shading method, the distance between the object(the model) for texture mapping and the light source, as well as the angles made by normal vectors to the object surface, are used to compute texture data UV coordinates (read addresses), and brightnesses and colors are appropriately filtered and textures mapped to the object surface. FIG. 8 is a figure explaining the texture data used in conventional cell shading. The texture data 70 shown in the figure is used for shading processing from white to black when the brightness of the object surface exceeds a constant threshold, and in the normalized UV coordinate system ($0.0 \leq U \leq 1.0$ and $0.0 \leq V \leq 1.0$), comprises data regions 71 in which "white" data ($0.0 \leq U \leq 0.5$ and $0.0 \leq V \leq 1.0$) is allocated as well as data regions 72 in which "black" data ($0.5 \leq U \leq 1.0$ and $0.0 \leq V \leq 1.0$) is allocated UV coordinates referenced during texture mapping can be computed using the following two equations.

$$U = a*I + b \quad (1)$$

$$V = c*I + d \quad (2)$$

Here I is the brightness value, computed from the inner product of the normalized normal vector to the object surface and the normalized light ray vector, and a, b, c, d are constants. Because the cell shading method is well known, the details of a, b, c, d are here omitted. If the brightness I can be computed, the UV coordinates for the texture data can be computed from equations (1) and (2). The movement locus of UV coordinates when the value of the brightness I is changed is similar to the straight line 73. As is clear from the figure, as a result of light source calculations, when setting the UV values at each vertex of the object, a small U value is specified and white texture mapping is performed at each portion for which the angle made by the object surface normal vector and the light ray vector is small and on which a large amount of light is incident; on the other hand, a large U value is specified and black texture mapping is performed at each portion for which the angle made by the object surface normal vector and the light ray vector is large and on which not much light is incident. In other words, when the U value exceeds 0.5, pixels on the object surface are shaded from white to black. Thus by performing shading processing using the two values of white and black, the difference between exposed faces and unexposed faces on the object surface can be made apparent, and so-called animation-style shading can be performed.

However, in conventional cell shading methods, it is necessary to prepare texture data for shading according to the light source color, distance between light source and object, light intensity of the light source, and other exposure conditions, and consequently there are the problems of additional labor for the designer, and waste of hardware resources. Further, in the past object details were represented in texture mapping by applying a two-dimensional design or pattern to a two-dimensional plane; but when texture mapping is employed for shading as described above, because texture data for shades suffices in only a single-dimension direction, the use of two-dimensional texture data as texture data for shading results in wasted memory. This problem is explained referring to FIGS. 9 and 10.

FIG. 9 explains a case in which the texture data to be used is changed according to the color of the light source; as the light sources illuminating the object 50, a red light source 41, green light source 42, and blue light source 43 are arranged in a virtual space. Three types of texture data are prepared for binary shading processing according to each light source color. In the state shown in the drawing, because the object 50 is in the position of the green light source 42, texture data for green shading processing is used to perform texture mapping. However, when the object 50 crosses the boundary 61 between the red light source 41 and green light source 42 to move to the side of the red light source 41, the texture data for the green light source 42 can no longer be used for shading, and shading must be performed using the texture data for the red light source 41. When the texture data to be used is suddenly changed at the border line 61, the shading displayed on the surface of the object 50 suddenly changes, and the appearance of the graphic display is extremely unnatural. The case in which the object 50 crosses the boundary 62 between the green light source 42 and blue light source 43 to move to the side of the blue light source 43 is similar.

FIG. 10 explains a case in which the texture data used is changed according to the positional relation between the camera (virtual viewpoint) and object; the light source 40, object 50, and camera 60 are arranged in prescribed positions. In three-dimensional computer graphics, each of the polygons comprised by the object 50 is modeling-transformed into world coordinates, and after performing field-of-view transformation to the camera viewpoint as seen from the camera 60, three-dimensional clipping processing, hidden surface elimination, texture mapping, shading processing, display priority processing, and other processing, the result is displayed on a video display. Because the shading to which the object 50 is subjected is viewed differently according to the distance between the camera 60 and object 50, texture data for a plurality of types of shading processing are prepared in advance, and when the distance between the object 50 and camera 60 exceeds a certain distance, the texture used in shading is changed. In the example of the drawing, when the object 50 crosses over the boundary 63 and moves farther from the camera 60, the texture used is changed. However, if the texture used changes suddenly at the boundary 63, the shades displayed on the surface of the object 50 changes suddenly, and the appearance of the graphic display is extremely unnatural.

However, of the texture data 70 shown in FIG. 8, the data actually used is only the data on the straight line 73, and the other data regions are not used, and the problem of considerable waste of memory for texture data storage has been noted.

SUMMARY OF THE INVENTION

An object of the present invention is to propose a data structure for texture data, a program to cause a computer system to execute texture mapping, and texture mapping method, and a texture mapping device which resolve the above-described problems and enable smooth shading while also conserving memory resources.

In order to resolve the above problems, this invention provides a method comprising a step in which, in order to access texture data comprising a computer-readable data region in which color data forming density gradients in two mutually orthogonal directions is arranged, coordinates are calculated in order to access the above data region in one of the directions among the above two directions, using brightness information of the object surface for texture mapping based on a prescribed equation; a step to calculate coordinates to access the above data region in the other direction of the above two directions based on an arbitrary value substituted into a dynamic variable; and, a step to read color data by accessing the above data region based on the calculated coordinates and perform texture mapping to the surface of the above object.

Further, the present invention can provide computer-readable recording media on which is recorded a computer program to cause a computer system to execute the above method. Such recording media may be, for example, optical recording media (such as CD-RAM, CD-ROM, DVD-RAM, DVD-ROM, DVD-R, PD discs, MD discs, MO discs, and other recording media the data of which can be read optically), magnetic recording media (such as flexible disks, magnetic cards, magnetic tape, and other recording media the data of which can be read magnetically), as well as memory cartridges comprising DRAM, SRAM, MRAM, FRAM, or other memory devices, and other transportable recording media.

Moreover, the above program can be distributed on demand from a Web server or other network server in response to a request from a client device (such as a personal computer, game equipment, portable telephone equipped with a Web browser, PDA, Palm-type PC, or other portable information terminal or similar) connected to the Internet or to a packet communication or other open network.

DESCRIPTION OF THE PREFERRED EMBODIMENTS

Figure 1:
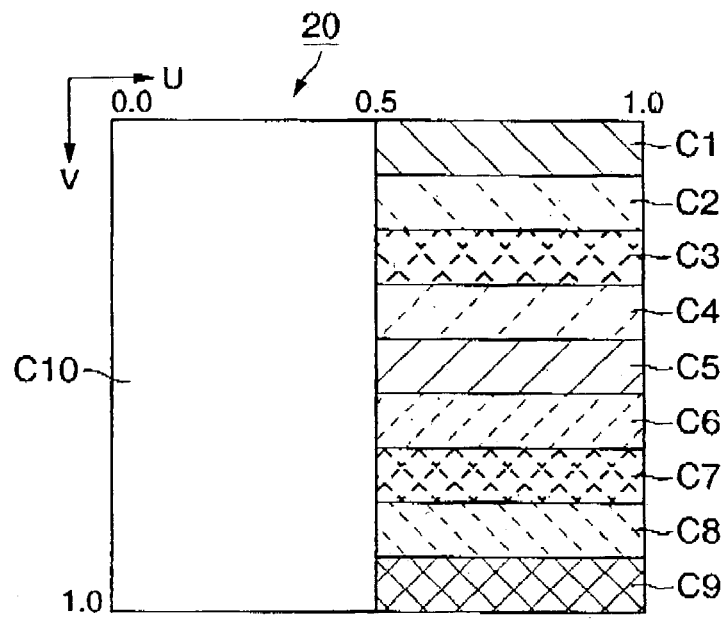
FIG. 1 is a drawing which explains texture data.

Below, aspects of this invention are explained, referring to the drawings.

Figure 7:
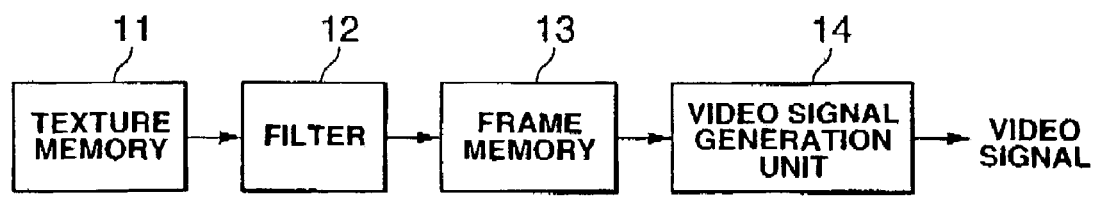
FIG. 7 is a functional block diagram of the generation of video signals.
Figure 8:
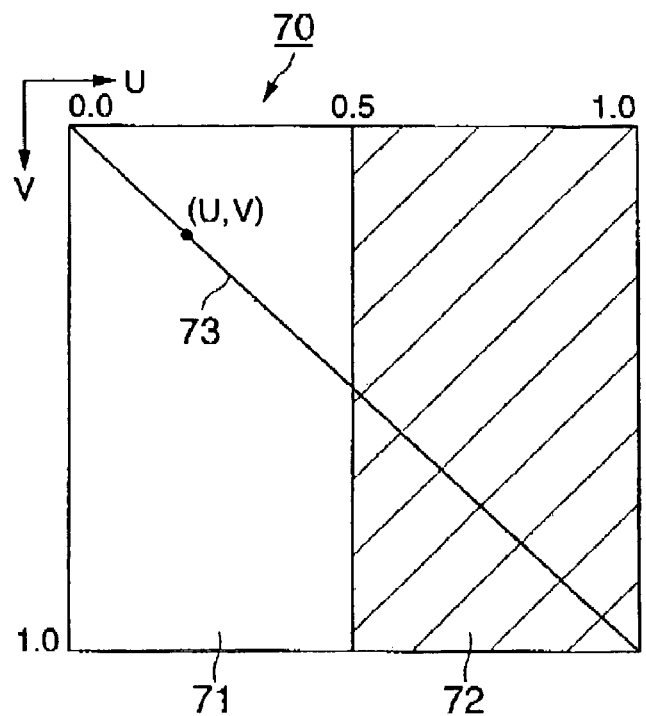
FIG. 8 is a drawing which explains conventional texture data.
Figure 9:
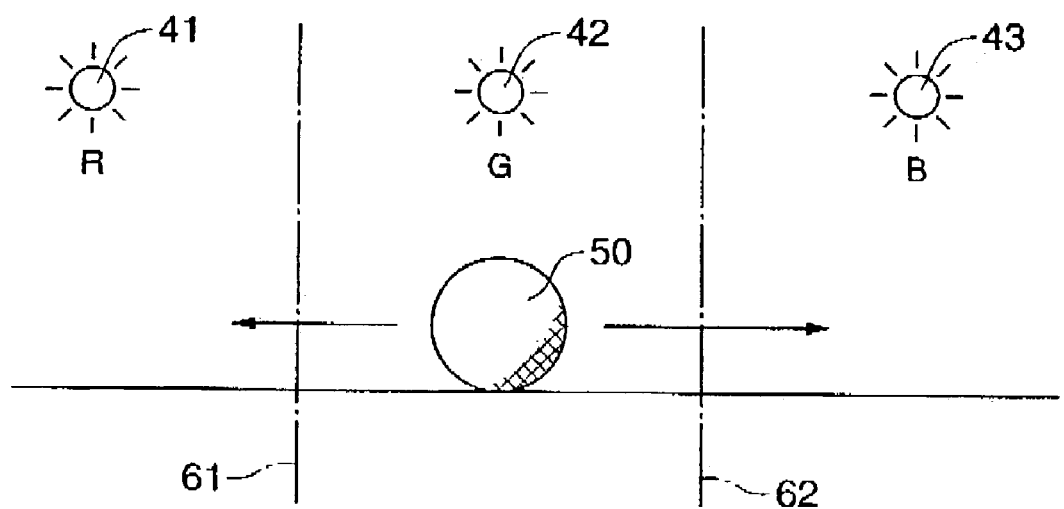
FIG. 9 is a drawing which explains conventional texture mapping; and,
FIG. 10 is a drawing which explains conventional texture mapping.
Figure 10:
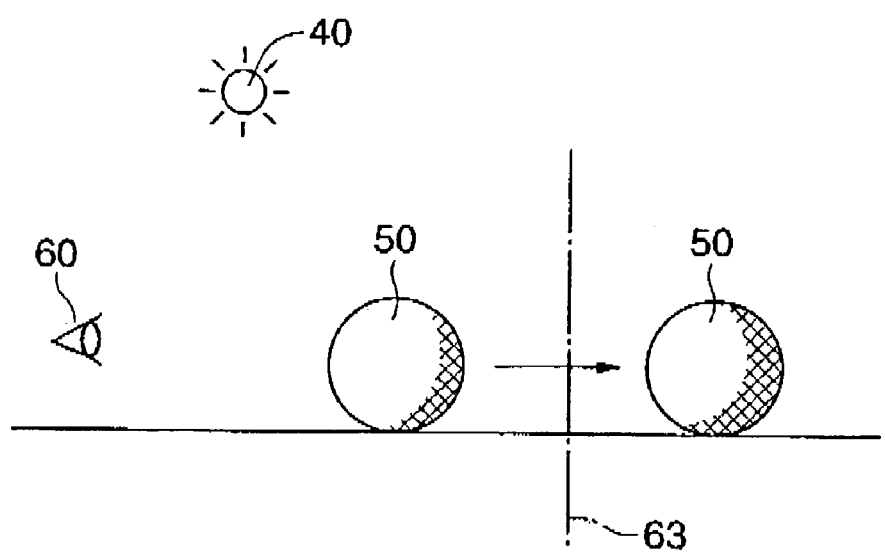

FIG. 7 is a functional block diagram of texture mapping onto an object using texture data for shading, to output video signals to a video display. In the figure, 11 is texture memory in which is stored texture data, 12 is a filter, 13 is frame memory for writing one screen's worth of image data, and 14 is a video signal generation unit to output video signals to a video display. After the results of light source calculations corresponding to individual pixels on the object surface or the vertices of polygons comprised by the object, which are brightness data and color data corresponding to each pixel or to the vertices of polygons, are read from texture memory 11, filter computations are performed in the filter 12, referring to the brightness data and color data of surrounding pixels, and the processing results are written to frame memory 13. The video signal generator unit 14 generates video signals based on the image data written to the frame memory 13, and outputs the signals to a video display, not shown.

FIG. 1 is a drawing which explains the texture data of this aspect. The texture data 20 shown in the drawing is, for convenience in explanation, shown with the texture in a state of expansion in a two-dimensional plane; however, the state in which data is stored in the texture memory 11 need not necessarily be expanded in a two-dimensional plane, and the data structure of the texture data is identical so long as the interrelation between color data at arbitrary coordinates of the texture data shown in the drawing is satisfied. In other words, "data structure" in this specification does not signify the interrelation between individual data bits in the state in which the texture data is stored in memory or other recording media, but refers instead to the interrelation between color data at individual coordinates defined by texture data read addresses. Color data comprises, in the-case of chromatic colors, information relating to brightness, hue, and color saturation, and in the case of achromatic colors, information relating to brightness (brightness and darkness). In the case of transparent colors, color data comprises information relating to transparency; in the case of colored translucence, color data comprises, in addition to transparency, information relating to brightness, hue, and saturation.

Figure 3:
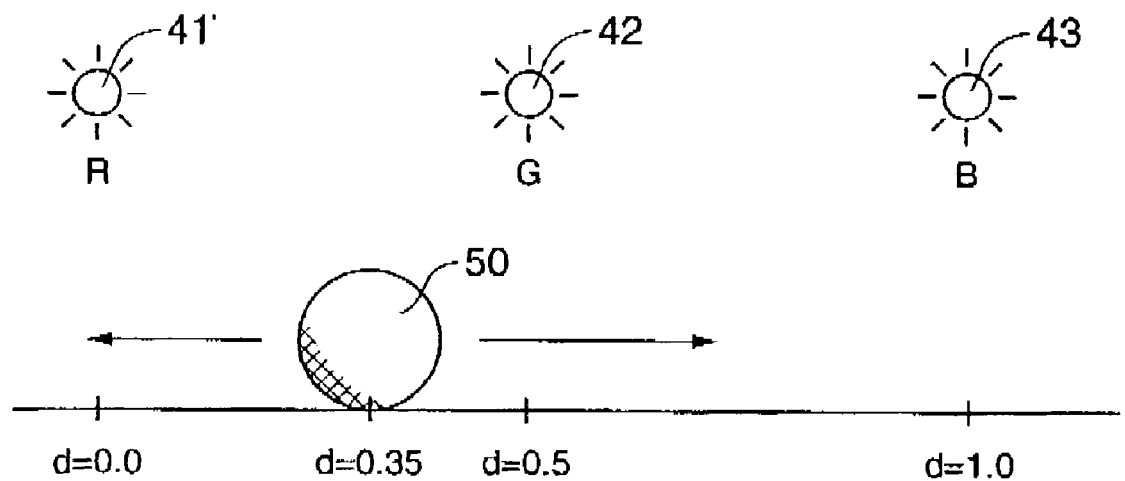
FIG. 3 is a drawing which explains texture mapping.

As shown in FIG. 3, the texture data 20 is prepared for use in shading of the object surface in cases where the object 50 moves in the lateral direction in the drawing under the red, green, and blue light sources 41, 42 and 43. In the texture data 20, white texture data is allocated in data region C10 in which $0.0 \leq U \leq 0.5$ and $0.0 \leq V \leq 1.0$, and texture data for use in shading for the light sources 41, 42, 43 is allocated at substantially equal intervals in data regions C1 to C9, in which $0.5 \leq U \leq 1.0$ and $0.0 \leq V \leq 1.0$. More specifically, C1 is deep red texture data, C2 is light red, C3 is a mixture of light red and light green, C4 is light green, C5 is dark green, C6 is light green, C7 is a mixture of light green and light blue, C8 is light blue, and C9 is dark blue texture data. That is, texture data for shading in a plurality of different color tones is arranged in the V coordinate direction, according to the positions of the light sources 41, 42 and 43. In the example shown in the drawing, for convenience in explanation, a density gradient is provided in nine stages; however, in actuality a finer density gradient, with several tens of stages, may be provided. Of course, setting the U coordinate and V coordinate of the texture in the opposite manner does not change the essence of this invention. By providing a density gradient which is appropriate to the application, various shading processing can be performed, from animation-style shading processing with binary shades, to comic-style shading processing with multi-value shades. In this aspect, when using the texture data 20 to perform shading, equation (1) is employed to compute the U value through light source calculations, and in place of equation (2), the following equation (3) is used to determine the V value.

$$V = d \qquad (3)$$

According to equation (3), the v value can be set by the value of the variable d, regardless of the brightness I. The variable d is a dynamic variable which can be changed arbitrarily by the program, and can, for example, be changed in realtime according to the distance between the light source and object; moreover, the variable d can be changed as appropriate according to an unfolding game situation in a virtual space (for example, according to whether a player is in a favorable situation or not, or whether the number of points scored is increased or not), regardless of the positional relation with the light source. The value to which the variable d is set can be decided appropriately by the programmer according to various applications, such as whether this invention is to be used for computer graphics art or for game applications.

For example, in the example of FIG. 1, if the value of d is set to 0.15, light red shading enables representation of a weak contrast, whereas if the value of d is set to 0.9, dark blue shading can be used to represent a strong contrast. If the value of d is defined in association with the distance from the light source, the value of d can be changed in realtime in concert with the positional relation between the light source and the object. For example, in the example of FIG. 3 a coordinate axis is set in the lateral direction in the drawing, and if the position of the light source 41 is set to d=0.0, the position of the light source 42 is set to d=0.5, and the position of the light source 43 is set to d=1.0, then as the object 50 approaches the light source 41, the value of d approaches to 0.0; as the object 50 approaches the light source 42, the value of d approaches 0.5; and as the object 50 approaches the light source 43, the value of d approaches 1.0. In the example of the drawing, the object 50 is slightly to the left of the position of the light source 42; if the value of d on the above coordinate axis is determined to be d=0.35, the color of shades on the surface of the object 50 will be light green.

In this way, by using the U value for shading, and using the V value for color tone control of the shades, smooth shading processing for light sources with three colors can be realized. And because there is no sudden change in the color tone of shades at a boundary set in advance by the positional relation with light sources, as in the prior art, smooth shading without abnormalities can be realized. Also, in the prior art it was necessary to prepare a plurality of texture data sets according to the number of light sources, but in the present aspect only one data set is necessary, so that the labor of a designer creating a plurality of texture data sets can be eliminated, and texture memory requirements can be reduced.

Figure 4:
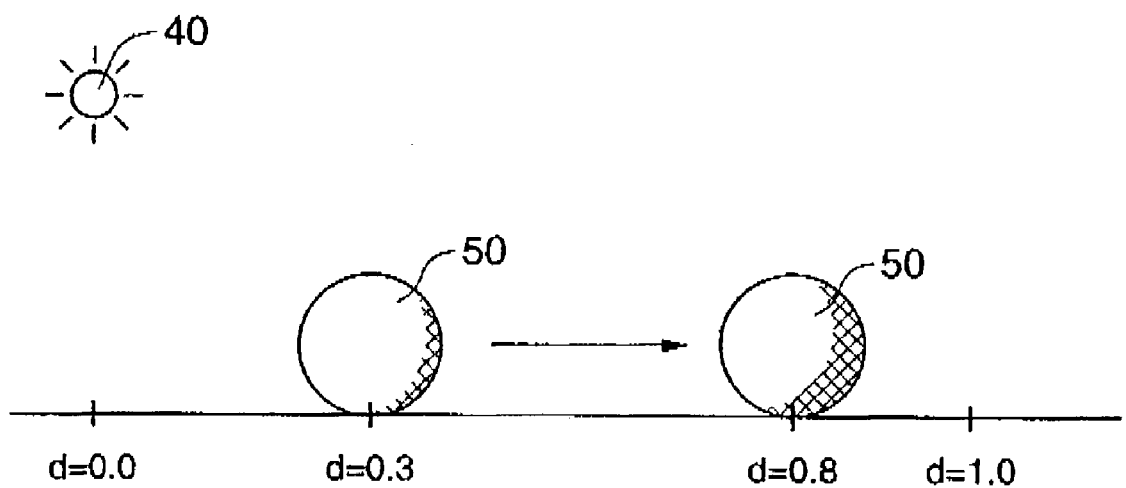
FIG. 4 is a drawing which explains texture mapping.

Another usage example employing the texture data of this aspect is explained below. If it is supposed that a density gradient is set such that the texture data gradually changes from dark black to light black as the value of d increases from 0.0 to 1.0, then the shade contrast can be changed in concert with the positional relation between light source and object. For example, in FIG. 4, a coordinate axis is set in the lateral direction in the drawing, and if the position of the light source 40 is d=0.0, then as the object moves away from the light source 40, the value of d changes from d=0.0 to d=1.0. For example, at d=0.3 the distance between the light source 40 and the object 50 is relatively small, so that shading is performed using shades with a comparatively strong contrast, whereas when d=0.8 the distance between the light source 40 and object 50 is relatively large, so that shading is performed using shades with a comparatively weak contrast. In other words, in moving away from the light source 40, the intensity of light incident on the object surface weakens in inverse proportion to the square of the distance, so that shading with gradually weaker contrast is performed, and an effect equivalent to the effect of lighting can be obtained.

Figure 5:
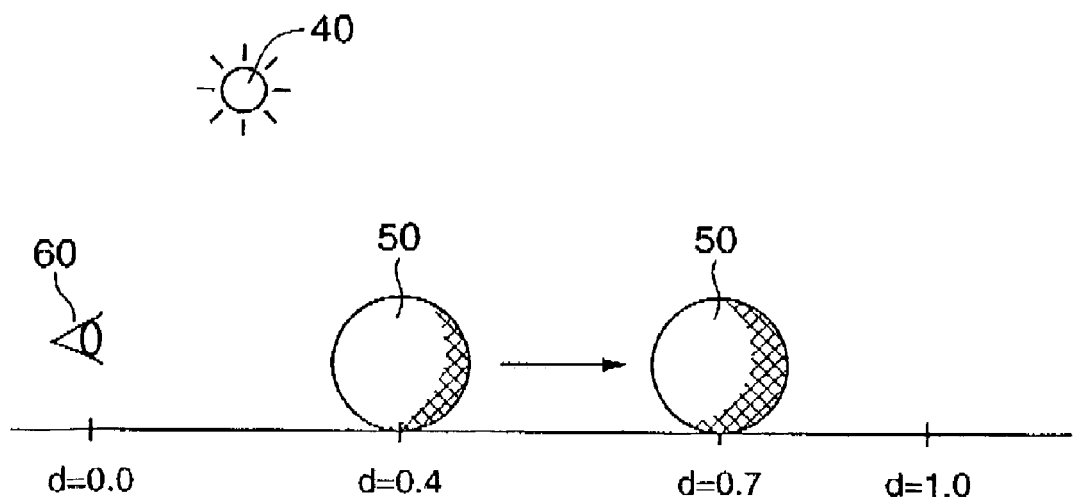
FIG. 5 is a drawing which explains texture mapping.

FIG. 5 is a drawing explaining the case in which the value of d is changed in concert with the distance between the camera 60 and object 50 to perform shading. A coordinate axis is set in the lateral direction in the drawing, and if the position of the camera 60 is d=0.0, then the value of d changes from d=0.0 to d=1.0 as the object moves away from the camera 60. If it is supposed that a density gradient is set such that, as the value of d increases from 0.0 to 1.0, the texture data changes gradually from dark black to light black, then as the object moves away from the camera 60, shading is performed with gradually weaker contrast, and an effect similar to fog can be obtained.

This invention is not limited to cases in which the value of d is changed according to the distance between the light source or camera and the object to perform shading; for example, the light intensity of the light source may be associated with the value of d to perform shading. For example, if the value of d is 0.0 for a light source for which the light intensity is maximum, and the value of d is gradually increased as the light intensity gradually weakens, so that the value of d is 1.0 for a light source with minimum light intensity, then fine adjustment of the shade contrast can be performed according to the magnitude of the light intensity of the light source. However, in this case it is assumed that a density gradient is set such that, as the value of d increases from 0.0 to 1.0, the texture data changes gradually from dark black to light black. Further, as, an example of setting of the d value, the value of d may be associated with the distance from the object to sea level, or with the distance between objects, or with other game parameters.

Figure 2:
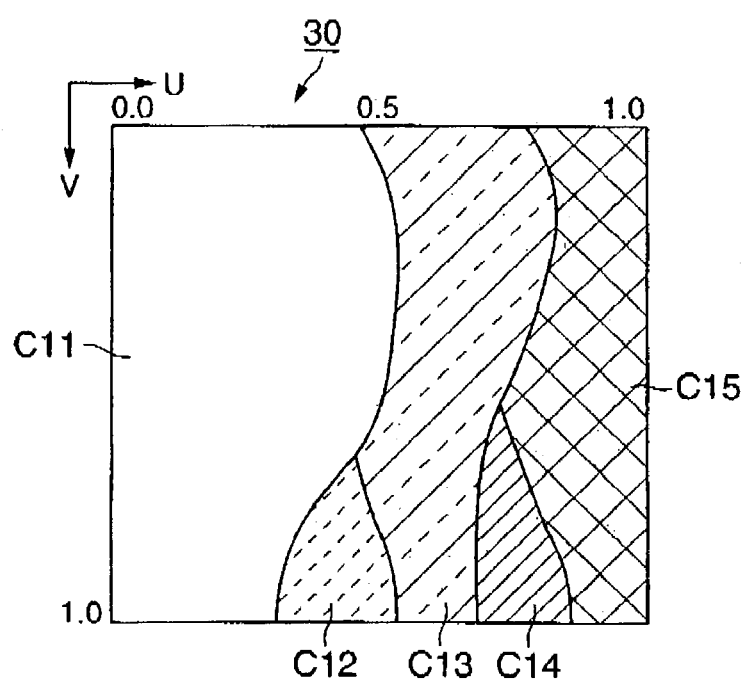
FIG. 2 is a drawing which explains texture data.
Figure 6:
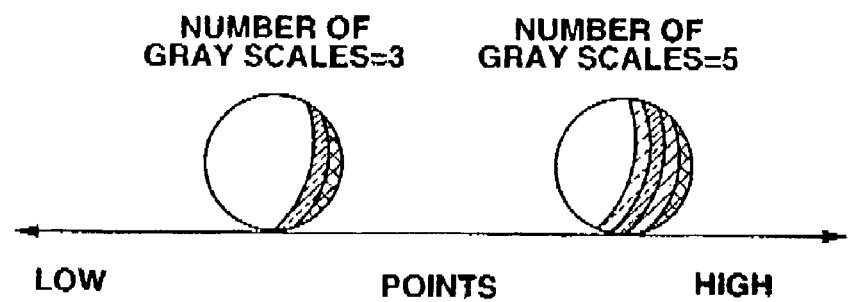
FIG. 6 is a drawing which explains texture mapping.

FIG. 2 shows another example of texture data. The texture data 30 shown in the drawing is arranged in a white data region C11, light gray data region C12, gray data region C13, dark gray data region C14, and black data region C15, so as to form curved density gradients in the U coordinate direction and in the V coordinate direction. Equation (1) is used to determine the U value of texture data 30 through light source calculations, and equation (3) is used to determine the V value. By using the texture data 30, the number of gray scales of the shades corresponding to the d value can be adjusted. For example, if the d value is 0.2, the V value can take the values of any of the data regions C11, C13, or C15, so that three values are possible for shades; if the d value is 0.8, the V value can take the values of any of the data regions from C11 to C15, so that five values are possible for shades. FIG. 6 explains an example of application of shading using the texture data 30; by increasing or decreasing the value of d in concert with the number of points obtained by a player in a game, the number of gray scales of shades is adjusted. In the example of the drawing, when there are no points, the number of gray scales is set to 3 by setting the d value to 0.2, and when there are numerous points, the number of gray scales is set to 5 by setting the d value to 0.8. Because the number of gray scales of the shades of a game character or other object can be adjusted freely in concert with the number of points acquired by a player, the atmosphere of a character can be freely changed from animation-style to comic-style as the game unfolds, so that the game can be made more amusing.

As explained above, by means of this aspect, the color tone of the texture is changed not only in the U coordinate direction, but in the V coordinate direction as well; hence it is possible, for example, to apply shading in a smooth transition from red shades to blue shades, and the color tone of the shades can be changed naturally and without abnormalities. And because the texture for shading has a design in advance, more complex drawing can easily be performed compared with the continuous changes of conventional fog. Also, whereas in the prior art a plurality of texture data sets were prepared corresponding to the number of light sources or other conditions, in this aspect the plurality of texture data sets can be consolidated into a single texture data set, so that the hit rate of the cache can be raised, and the drawing speed can be increased. Also, the V value can be specified independently and regardless of the brightness I, so that data regions in the entirety of the texture data can be utilized effectively, with no waste of texture memory.

According to this aspect, in addition to the number of color tones and number of stages of shades, highlights which appear in stages, increases and decreases in reflected light amounts, changes in the exposed area of the object surface, changes in color tones and color saturation, changes in transparency, and other parameters can be freely adjusted. And, by appropriately changing the setting of the d value, noise-like representations, as well as changes in light amounts which give a "dancing" effect as if light from a flame were incident, and changes in the area ratios of shaded portions and exposed portions, can be represented. Also, by changing the value of d at each vertex of the object, complicated point light sources can be represented, changes in the shades only of specific portions of the object surface can be represented, and a luster only at a specific portion can be represented. In addition to texture mapping to an object comprising polygons, this invention can also be used in texture mapping to NURBS and other curved surfaces.

By means of this invention, texture mapping is performed using texture data comprising computer-readable data regions in which color data is arranged forming density gradients in two mutually orthogonal directions, so that coordinates to access the texture data can be computed from a value computed from object surface brightness information using a prescribed equation and from a value computed based on an arbitrary value assigned to a dynamic variable, and the color tone, density, and other parameters of the texture data to be read can be changed appropriately according to the assigned value of the dynamic variable. Hence shading with different shade colors can be displayed with natural transitions. Also, a plurality of texture data sets can be consolidated into a single texture data set, so that texture memory requirements can he reduced.

What is claimed is:

1. A texture mapping method for mapping texture data to an object surface based on a result of light source calculations at the object surface, comprising:

calculating a U value for the texture data from an equation $U=a*I+b$, in which I is a brightness value calculated from the inner product of a normalized vector to the object surface and a normalized light ray vector, and a and b are constants;

calculating a V value for the texture data from $v=d$, a number of tones of the texture data increasing or decreasing according to an increase or decrease in the value of a variable d, regardless of the U value;

mapping the texture data defined by the U value and the V value to the object surface; and storing the mapped texture data on a frame memory.

2. The texture mapping method according to claim 1, wherein a color of the texture data changes to a single color or a mixed color according to the variable d, regardless of the U value.

3. The texture mapping method according to claim 1, wherein the value of the variable d is updated according to the positional relationship between the object and a light source.

4. The texture mapping method according to claim 1, wherein the value of the variable d is updated according to a positional relationship between the object and a virtual viewpoint.

5. The texture mapping method according to claim 1, wherein the value of the variable d is updated according to an arbitrary game parameter set in advance.

6. A computer program product having a computer program stored on computer-readable recording media which causes a computer system to execute processing to map texture data to an object surface based on a result of light source calculations at the object surface, wherein said computer program causes the execution of:

calculating a U value for the texture data from an equation $U=a*I+b$, in which I is a brightness value that is calculated from an inner product of a normalized vector to the object surface and a normalized light ray vector, and a and b are constants;

calculating a V value for the texture data from $V=d$, a number of tones of the texture data increasing or decreasing only according to an increase or decrease in the value of the variable d, regardless of the U value, and mapping the texture data defined by the U value and the V value to the object surface.

7. The computer program product according to claim 6, wherein a color of the texture data changes to a single color or a mixed color according to the value of the variable d, regardless of the U value.

8. The computer program product according to claim 6, wherein the value of the variable d is updated according to a positional relationship between the object and a light source.

9. The computer program product according to claim 6, wherein the value of the variable d is updated according to a positional relationship between the object and a virtual viewpoint.

10. The computer program product according to claim 6, wherein the value of the variable d is updated according to an arbitrary game parameter set in advance.

11. The computer program product according to claim 6, wherein a transparency of the texture data increases or decreases according to the d value, regardless of the U value.

12. The computer program product according to claim 6, wherein a brightness of the texture data increases or decreases according to the d value, regardless of the U value.

13. A device for mapping texture data to an object surface based on a result of light source calculations at the object surface, the device comprising:

calculating unit for calculating a U value for the texture data from the equation $U=a*I+b$, in which I is a brightness value, calculated from the inner product of a normalized normal vector to the object surface and a normalized light ray vector, and a and b are constants;

a calculating unit for calculating a V value for the texture data from $V=d$, a number of tones of the texture data increasing or decreasing only according to an increase or decrease in the value of the variable d, regardless of the U value; and a mapping unit for mapping the texture data defined by the U value and the V value to the object surface.

14. The texture data mapping device according to claim 13, wherein a color of the texture data changes to a single color or a mixed color according to the value of the variable d, regardless of the U value.

* * * * *

UNITED STATES PATENT AND TRADEMARK OFFICE
CERTIFICATE OF CORRECTION

| | | |
|---|---|---|
| PATENT NO. | : 7,193,630 B2 | Page 1 of 1 |
| APPLICATION NO. | : 10/361565 | |
| DATED | : March 20, 2007 | |
| INVENTOR(S) | : Yuichi Higuchi et al. | |

It is certified that error appears in the above-identified patent and that said Letters Patent is hereby corrected as shown below:

Column 8, lines 18-19. "value, and" should read --value; and--.

Column 8, line 48, "calculating unit for" should read --a calculating unit for--.

Signed and Sealed this

Twenty-sixth Day of June, 2007

JON W. DUDAS
*Director of the United States Patent and Trademark Office*